(12) United States Patent
Gupta et al.

(10) Patent No.: US 9,961,157 B2
(45) Date of Patent: May 1, 2018

(54) ADAPTIVE COMPRESSION MANAGEMENT FOR WEB SERVICES

(71) Applicant: Dell Products, L.P., Round Rock, TX (US)

(72) Inventors: Chitrak Gupta, Bangalore (IN); Abhirup Seal, Bangalore (IN); Lucky Pratap Khemani, Bangalore (IN)

(73) Assignee: DELL PRODUCTS L.P., Round Rock, TX (US)

( * ) Notice: Subject to any disclaimer, the term of this patent is extended or adjusted under 35 U.S.C. 154(b) by 602 days.

(21) Appl. No.: 14/538,601

(22) Filed: Nov. 11, 2014

(65) Prior Publication Data
US 2016/0134723 A1    May 12, 2016

(51) Int. Cl.
G06F 15/16 (2006.01)
H04L 29/08 (2006.01)

(52) U.S. Cl.
CPC ................... H04L 67/2828 (2013.01)

(58) Field of Classification Search
CPC ......................................... H04L 67/02
USPC ........................................ 709/247
See application file for complete search history.

(56) References Cited

U.S. PATENT DOCUMENTS

| | | | | |
|---|---|---|---|---|
| 7,573,886 B1 * | 8/2009 | Ono | ................... | H04L 41/0896 370/352 |
| 8,949,466 B1 * | 2/2015 | Crosbie | ................... | H04L 47/38 709/247 |
| 2002/0103938 A1 * | 8/2002 | Brooks | ................... | H03M 7/30 709/247 |
| 2005/0055464 A1 * | 3/2005 | Weller | ................... | H04L 69/04 709/247 |
| 2006/0195464 A1 * | 8/2006 | Guo | ................... | H04L 29/06027 |
| 2007/0136492 A1 * | 6/2007 | Blum | ................... | G06Q 10/107 709/247 |
| 2009/0046775 A1 * | 2/2009 | Thiagarajan | ............. | H04B 1/59 375/240 |
| 2010/0067393 A1 * | 3/2010 | Sakimura | ............ | H04L 43/0864 370/252 |
| 2010/0166065 A1 * | 7/2010 | Perlman | ................... | A63F 13/12 375/240.07 |
| 2012/0117160 A1 * | 5/2012 | Bickson | ................... | H04L 67/02 709/206 |
| 2013/0100816 A1 * | 4/2013 | Bergamasco | ....... | H04L 43/0864 370/237 |
| 2013/0117298 A1 * | 5/2013 | Ray | ................... | G06F 17/30091 707/769 |

(Continued)

Primary Examiner — Hamza N Algibhah
(74) Attorney, Agent, or Firm — Norton Rose Fulbright US LLP (57) ABSTRACT

Embodiments of methods, systems, and apparatuses for adaptive compression management for web services are presented. In an embodiment, a method may include receiving a request for a web-service data operation. The method may also include identifying, using a data processing device, a network performance statistic for characterizing a data link between a web server and a web client. Additionally, the method may include determining, using the data processing device, a data size threshold in response to the network performance statistic. The method may also include determining, using the data processing device, whether to compress data associated with the web-service operation in response to the data size threshold.

18 Claims, 9 Drawing Sheets

(56) References Cited

U.S. PATENT DOCUMENTS

2013/0145412 A1* 6/2013 Perlman ............ H04N 21/2143
　　　　　　　　　　　　　　　　　　　　　　725/109
2013/0318197 A1* 11/2013 Plaisted ................ H04L 69/04
　　　　　　　　　　　　　　　　　　　　　　709/217
2015/0088945 A1* 3/2015 Kruus .................... H03M 7/30
　　　　　　　　　　　　　　　　　　　　　　708/203
2016/0127490 A1* 5/2016 Li ....................... H04L 67/2828
　　　　　　　　　　　　　　　　　　　　　　709/247

* cited by examiner

ADAPTIVE COMPRESSION MANAGEMENT FOR WEB SERVICES

FIELD

This disclosure relates generally to information handling systems, and more specifically, to adaptive compression management for web services.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Web Service Management (WSMan) protocol is used to fetch relevant data over the network from a web service server to a client. The volume of data transmitted may range from a few bytes to a few megabytes. Generally, the data is transmitted according to a protocol, such as Simple Object Access Protocol (SOAP). There are mechanisms for compressing a SOAP packet before it hits the network, thereby saving network bandwidth and time, but this overall saving is not guaranteed for small amounts of data in the range of few kilobytes. For smaller data, the added compression time may actually lengthen the overall response time of the system, depending upon the network delay. Thus it may not be optimal to impose a universal or binding compression policy on all SOAP packets transmitted over a network.

SUMMARY

Embodiments of methods, systems, and apparatuses for adaptive compression management for web services are presented. In an embodiment, a method may include receiving a request for a web-service data operation. The method may also include identifying, using a data processing device, a network performance statistic for characterizing a data link between a web server and a web client. Additionally, the method may include determining, using the data processing device, a data size threshold in response to the network performance statistic. The method may also include determining, using the data processing device, whether to compress data associated with the web-service operation in response to the data size threshold.

In an embodiment, the method may also include retrieving data in response to the request for a web-service data operation. In such an embodiment, the data size threshold may be determined in parallel with retrieving the data in response to the request for a web-service data operation.

In an embodiment, determining the data size threshold may include comparing a current network performance statistic to a historical maximum and a historical minimum of the network performance statistic.

Identifying the network performance statistic may include determining a round-trip time for communications between the web server and the web client. In such an embodiment, determining the data size threshold may include comparing a result of the round-trip time measurement, made in response to receiving the request, with the historical maximum and the historical minimum of the round-trip time.

In an embodiment, the method also includes compressing the data associated with the web-service data operation in response to a determination that the size of the data associated with the web-service data operation is within a range of data sizes defined by the data size threshold.

Embodiments of an apparatus may include an input interface configured to receive a request for a web-service data operation. The apparatus may also include a data processing device coupled to the input interface. The data processing device may be configured to identify a network performance statistic for characterizing a data link between a web server and a web client, determine a data size threshold in response to the network performance statistic, and determine whether to compress data associated with the web-service operation in response to the data size threshold.

Embodiments of a system may include a web client device configured to send a request for a web-service data operation over a network. The system may also include a web server coupled to the network. The web server may be configured to receive a request for a web-service data operation, identify a network performance statistic for characterizing a data link between a web server and a web client, determine a data size threshold in response to the network performance statistic, and determine whether to compress data associated with the web-service operation in response to the data size threshold.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Embodiments of methods and systems for adaptive compression management for web services are described. The described embodiments may generally include processes for receiving, at a web server, a request for data through a web service communication protocol, such as SOAP, etc. The process may additionally include determining one or more network performance statistic for characterizing a data communication link between the web server and a requesting web client. Additionally, the process may include determining a data size threshold in response to the network statistic (s). The process may also include determining whether or not to compress the data retrieved in response to the request based on whether the data volume is within a range defined by the data size threshold. In a particular embodiment, the data size threshold may be determined in parallel with the data retrieval process.

Beneficially, computing resources may be conserved by only compressing and decompressing network data with sufficient volume to impact network bandwidths. By eliminating compression and decompression processes for data sizes that are under the data size threshold, the described embodiments may reduce overall data transmission times and improve overall system performance.

Figure 1:
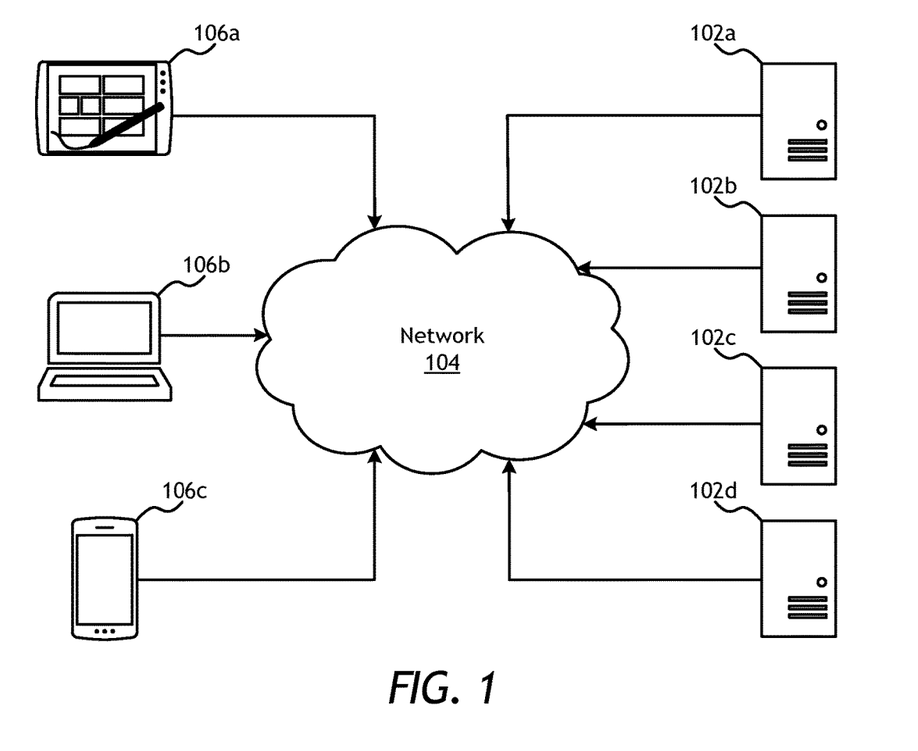
FIG. 1 is a schematic block diagram illustrating one embodiment of a system for adaptive compression management for web services.

FIG. 1 is a schematic block diagram illustrating one embodiment of a system 100 for adaptive compression management for web services. In an embodiment, the system 100 includes one or more web servers 102a-d. The web servers 102a-d may be coupled to a network 104. Additionally, one or more web clients 106a-c may be coupled to the network 104. The web clients 106a-c may communicate web service data requests to the web servers 102a-d via the network 104.

In an embodiment, a web server 102a-d may be configured to serve one or more web services to web clients 106a-c over the network 104. Web services may include web-based applications, web-based application components or plugins, web widgets, responsive data handling functions, etc. One of ordinary skill will recognize a variety of web services for which the present embodiments may be applicable. In a specific embodiment, the web server 102a-d may be configured to communicate over the network 104 with the web clients 106a-c according to one or more data communication protocols or standards, such as SOAP. In certain embodiments, the web servers 102a-d may include one or more data storage devices for storing data associated with the web services. In other embodiments, the protocol may include Extensible Markup Language Remote Procedure Call (XML-RPC), JavaScript Object Notation Remote Procedure Call (JSON-RPC), or the like. Indeed, one of ordinary skill will recognize a variety of protocols that may be used for communication between a web server 102a-d and a web client 106a-c over the network 104.

The network may include, for example, the Internet, a Wide Area Network (WAN), a Local Area Network (LAN), or the like. The network may include various components including, but not limited to network router devices, network switch devices, network hub devices, network security devices, etc. One of ordinary skill will recognize a variety of networking devices which may be included in a suitable network 104. The specific embodiments of the network 104 are not intended to limit the present embodiments, but merely facilitate communications between the web server 102a-d and the web client 106a-c according to the present embodiments.

A web client 106a-c may be any user interface device configured for communication with a web server 102a-d over a network 104. Examples of web clients may include a tablet computing device as illustrated in FIG. 1 with reference to numeral 106a. In further embodiments, the web client 106 a-c may include a laptop computer device or a smartphone device as depicted in FIG. 1 with reference to numerals 106b-c respectively. The web clients 106a-c and the web servers 102a-d are examples of information handling systems in which the present embodiments may be implemented.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 2:
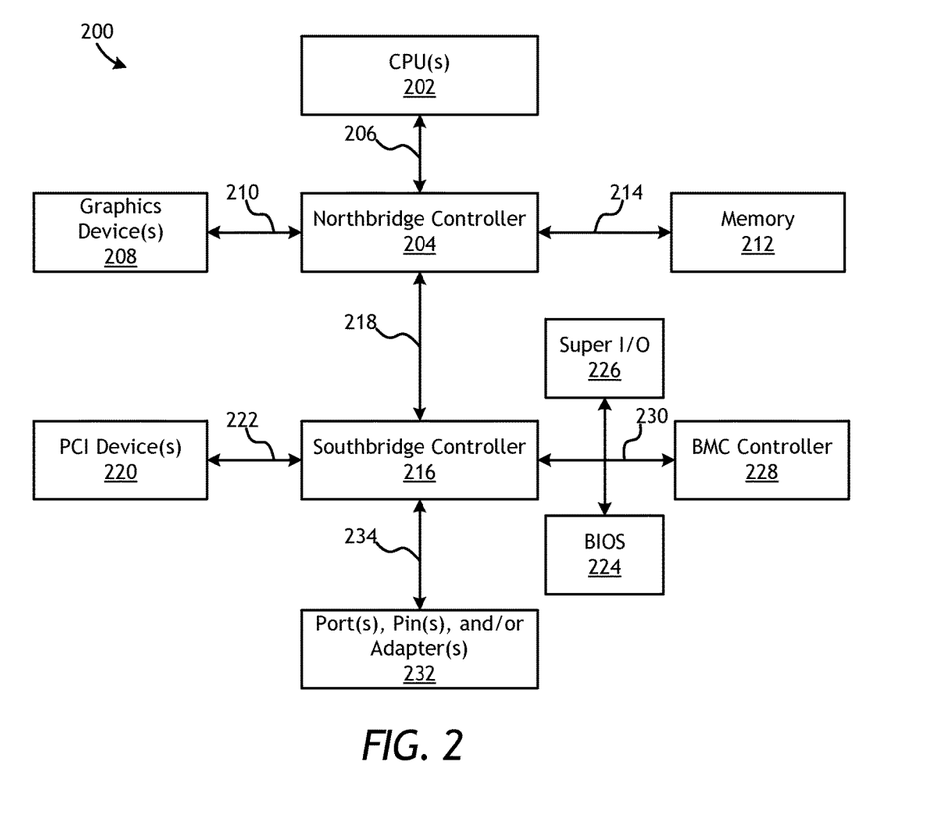
FIG. 2 is a schematic block diagram illustrating one embodiment of an Information Handling System (IHS) configured for adaptive compression management for web services.

FIG. 2 is a schematic block diagram illustrating one embodiment of an IHS 200 which may be programmed according to embodiments of web clients 106a-c and web servers 102a-d of FIG. 1. As shown, IHS 200 includes one or more CPUs 202. In various embodiments, IHS 200 may be a single-processor system including one CPU 202, or a multi-processor system including two or more CPUs 202 (e.g., two, four, eight, or any other suitable number). CPU(s) 202 may include any processor capable of executing program instructions. For example, in various embodiments, CPU(s) 202 may be processors capable of implementing any of a variety of instruction set architectures (ISAs), such as the x86, POWERPC®, ARM®, SPARC®, or MIPS® ISAs, or any other suitable ISA. In multi-processor systems, each of CPU(s) 202 may commonly, but not necessarily, be implement the same ISA.

CPU(s) 202 are coupled to northbridge controller or chipset 204 via front-side bus 206. In most embodiments, the front-side bus 206 will include multiple data links arranged in a set or bus configuration. Northbridge controller 204 may be configured to coordinate I/O traffic between CPU(s) 202 and other components. For example, in this particular implementation, northbridge controller 204 is coupled to graphics device(s) 208 (e.g., one or more video cards or adaptors, etc.) via graphics bus 210 (e.g., an Accelerated Graphics Port or AGP bus, a Peripheral Component Interconnect or PCI bus, etc.). Northbridge controller 204 is also coupled to system memory 212 via memory bus 214. Memory 212 may be configured to store program instructions and/or data accessible by CPU(s) 202. In various embodiments, memory 212 may be implemented using any suitable memory technology, such as static RAM (SRAM), synchronous dynamic RAM (SDRAM), nonvolatile/Flash-type memory, or any other type of memory.

Northbridge controller 204 is coupled to southbridge controller or chipset 216 via internal bus 218. Generally, southbridge controller 216 may be configured to handle various of IHS 200's I/O operations, and it may provide interfaces such as, for instance, Universal Serial Bus (USB), audio, serial, parallel, Ethernet, etc., via port(s), pin(s), and/or adapter(s) 232 over bus 234. For example, southbridge controller 216 may be configured to allow data to be exchanged between IHS 200 and other devices, such as other IHSs attached to a network. In various embodiments, southbridge controller 216 may support communication via wired or wireless general data networks, such as any suitable type of Ethernet network, for example; via telecommunications/telephony networks such as analog voice networks or digital fiber communications networks; via storage area networks such as Fiber Channel SANs; or via any other suitable type of network and/or protocol.

Southbridge controller 216 may also enable connection to one or more keyboards, keypads, touch screens, scanning devices, voice or optical recognition devices, or any other devices suitable for entering or retrieving data. Multiple I/O devices may be present in IHS 200. In some embodiments, I/O devices may be separate from IHS 200 and may interact with IHS 200 through a wired or wireless connection. As shown, southbridge controller 216 is further coupled to one or more PCI devices 220 (e.g., modems, network cards, sound cards, video cards, etc.) via PCI bus 222. Southbridge controller 216 is also coupled to Basic I/O System (BIOS) 224, Super I/O Controller 226, and Baseboard Management Controller (BMC) 228 via Low Pin Count (LPC) bus 230.

BIOS 224 includes non-volatile memory having program instructions stored thereon. Those instructions may be usable CPU(s) 202 to initialize and test other hardware components and/or to load an Operating System (OS) onto IHS 200. As such, BIOS 224 may include a firmware interface that allows CPU(s) 202 to load and execute certain firmware, as described in more detail below. In some cases, such firmware may include program code that is compatible with the Unified Extensible Firmware Interface (UEFI) specification, although other types of firmware may be used.

BMC controller 228 may include non-volatile memory having program instructions stored thereon that are usable by CPU(s) 202 to enable remote management of IHS 200. For example, BMC controller 228 may enable a user to discover, configure, and manage BMC controller 228, setup configuration options, resolve and administer hardware or software problems, etc. Additionally or alternatively, BMC controller 228 may include one or more firmware volumes, each volume having one or more firmware files used by the BIOS' firmware interface to initialize and test components of IHS 200.

Super I/O Controller 226 combines interfaces for a variety of lower bandwidth or low data rate devices. Those devices may include, for example, floppy disks, parallel ports, keyboard and mouse, temperature sensor and fan speed monitoring, etc. For example, the super I/O controller 226 may be coupled to the one or more upstream sensors 206 and to the one or more downstream sensors 208.

In some cases, IHS 200 may be configured to access different types of computer-accessible media separate from memory 212. Generally speaking, a computer-accessible medium may include any tangible, non-transitory storage media or memory media such as electronic, magnetic, or optical media—e.g., magnetic disk, a hard drive, a CD/DVD-ROM, a Flash memory, etc. coupled to IHS 200 via northbridge controller 204 and/or southbridge controller 216.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

A person of ordinary skill in the art will appreciate that IHS 200 is merely illustrative and is not intended to limit the scope of the disclosure described herein. In particular, any computer system and/or device may include any combination of hardware or software capable of performing certain operations described herein. In addition, the operations performed by the illustrated components may, in some embodiments, be performed by fewer components or distributed across additional components. Similarly, in other embodiments, the operations of some of the illustrated components may not be performed and/or other additional operations may be available.

For example, in some implementations, northbridge controller 204 may be combined with southbridge controller 216, and/or be at least partially incorporated into CPU(s) 202. In other implementations, one or more of the devices or components shown in FIG. 2 may be absent, or one or more other components may be added. Accordingly, systems and methods described herein may be implemented or executed with other computer system configurations. In some cases, various elements shown in FIG. 2 may be mounted on a motherboard and protected by a chassis or the like.

Figure 3:
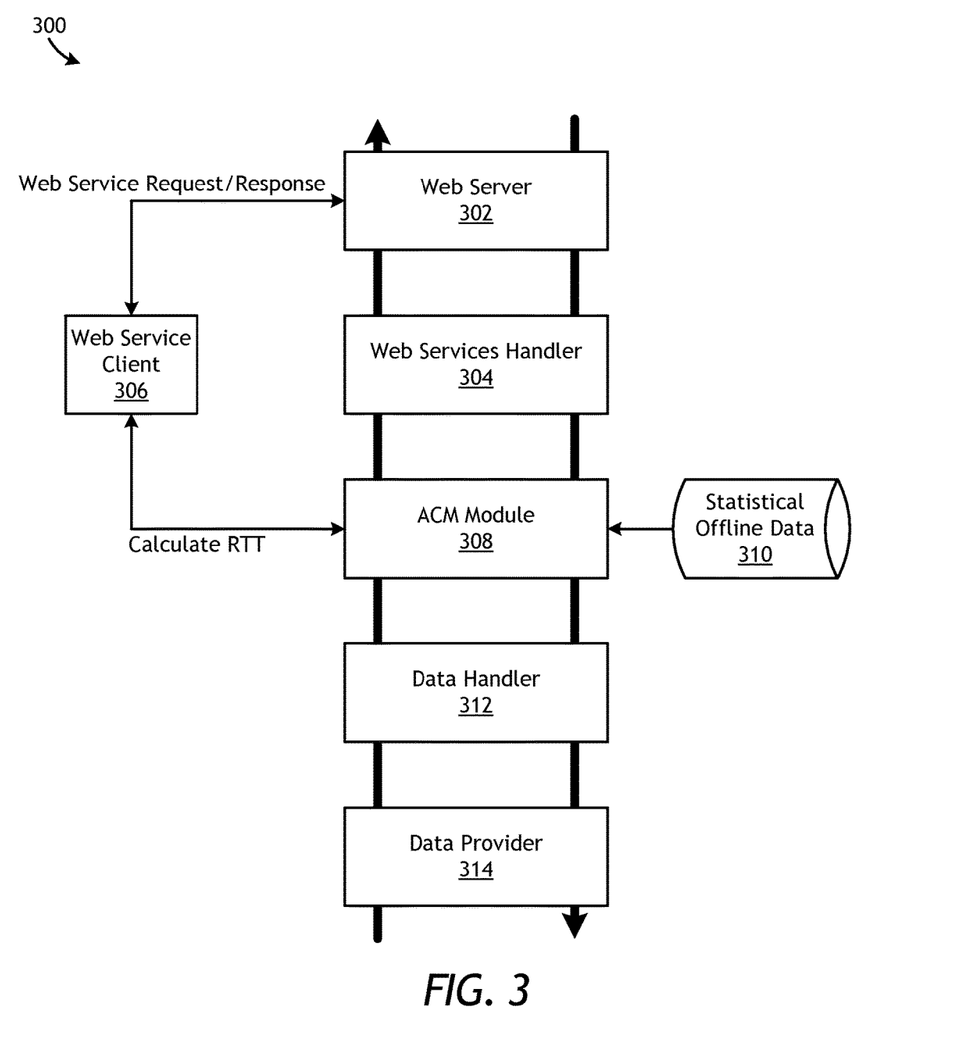
FIG. 3 is a software stack diagram for adaptive compression management for web services.

FIG. 3 is a software stack diagram for adaptive compression management for web services. In an embodiment, a web server component 302 may receive a request for a web-service data operation from the web services client 306. Examples of web-service data operations may include data fetch operations, data put operations, search commands, refresh commands, etc. One of ordinary skill will recognize a variety of web-service data operations. In a specific embodiment, the request for a web-service data operation may include a "pull" or "enumeration" command as defined by SOAP protocols. In some embodiments, the described processes may only be applied to "pull" or "enumeration" commands, and others will be processed according to standard protocol processes. One of ordinary skill will recognize similar commands in alternative protocols for which the present embodiments may be suitably applied.

The web server component 302 may pass the incoming request to the web services handler 304 for further processing of the request. In one embodiment, the web services handler 304 may call the Adaptive Compression Module (ACM) 308. The ACM module 308 may determine a network performance statistic, such as round trip time (RTT) between the web services client 306 and the web server 302, or the like. In another embodiment, the ACM 308 may request statistical data from a database of historical data 310 for calculating statistical averages in the absence of real-time data.

While the ACM 308 determines the network statistics and calculates the data size threshold, the data handler 312 may retrieve the requested data from the data provider 314. In an embodiment, an average threshold based on an average of a minimum recorded value of the network statistics and a maximum recorded value of the network statistics may be used in the event that the data is retrieved before the data size threshold can be calculated. When the data handler 312 receives the data from the data provider 314, the ACM module 308 may compare the size of the retrieved data with the data size threshold to determine whether the retrieved data is to be compressed or not. If the data is to be compressed, the web services handler 304 may compress the data and pass the compressed data to the web server component 302 for communication to the web services client 306. If not, the uncompressed data is provided to the web server component 302 for communication to the web services client 306. Further embodiments of processes which may be performed by the ACM 308 are described below with relation to FIGS. 8-9.

Figure 4:
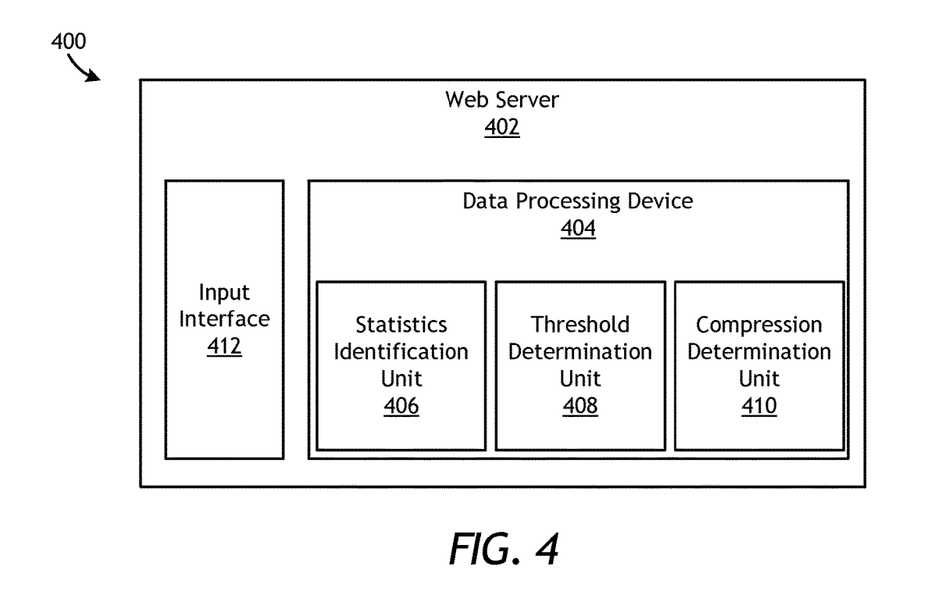
FIG. 4 is a schematic block diagram illustrating one embodiment of an apparatus configured for adaptive compression management for web services.

FIG. 4 is a schematic block diagram illustrating one embodiment of an apparatus 400 configured for adaptive compression management for web services. In an embodiment, the apparatus 400 is a web server 402. Embodiments of the web server 402 may include an input interface 412 and a data processing device 404. In an embodiment, the input interface 412 may be configured to receive a request for a web-service data operation. In response, the input interface 412 may pass the request to the data processing device 404, such as CPU(s) 202, for processing of the request. The data processing device 404 may include a statistics identification unit 406, a threshold determination unit 408 and a compression determination unit 410.

For example, in one embodiment, the statistics identification unit 406 may determine a real-time network performance statistic for characterizing a data link between the web server 402 and web client. In another embodiment, the statistics identification unit 406 may retrieve historical statistics data and calculate averages, weighted averages, or perform other computations for determining network performance statistics. In a further embodiment, the threshold determination unit 408 may use the statistics identified by the statistics identification unit 406 to determine a threshold. The compression determination unit 410 may then determine whether to compress data associated with the web-service operation in response to the data size threshold. For example, if the size of the data is too small, the data may not be compressed. If the data size is over the threshold, the data may be compressed. In further embodiments, the compression scheme may be modified in response to the data size being within a range defined by multiple thresholds calculated by the threshold determination unit 408.

Figure 5:
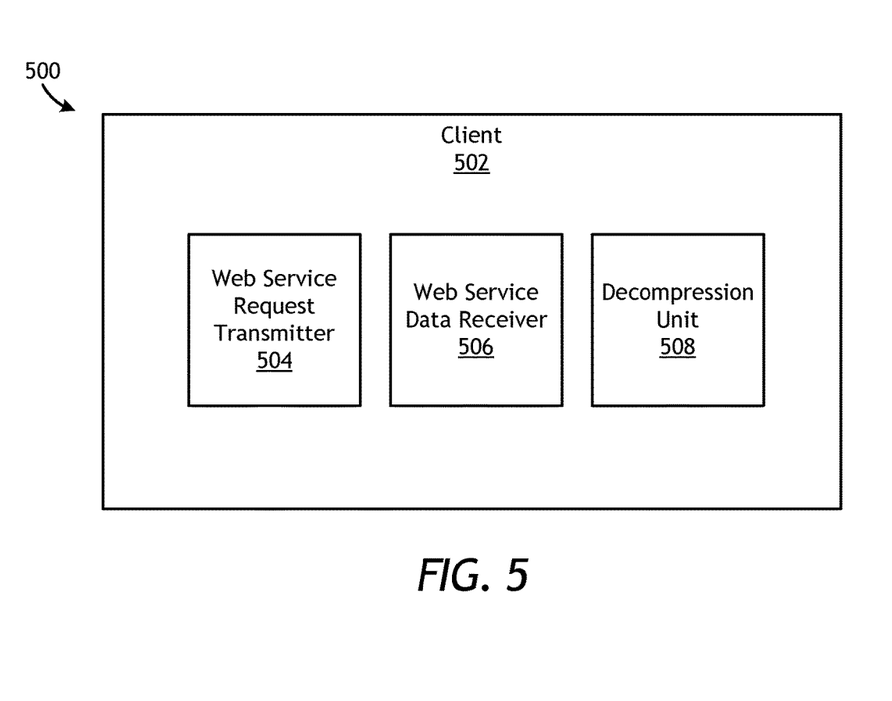
FIG. 5 is a schematic block diagram illustrating another embodiment of an apparatus configured for adaptive compression management for web services.

FIG. 5 is a schematic block diagram illustrating another embodiment of an apparatus 500 configured for adaptive compression management for web services. In an embodiment, the apparatus 500 is a web client 502. The web client 502 may include a web services request transmitter 504 configured to send a request for a web-service data operation over a network 104. The web client 502 may also include a web service data receiver 506 configured to receive data from a web server 402 in response to a request. The client 502 may also include a decompression unit 506 configured to decompress the received data, if the data has been compressed by the web server.

Figure 6:
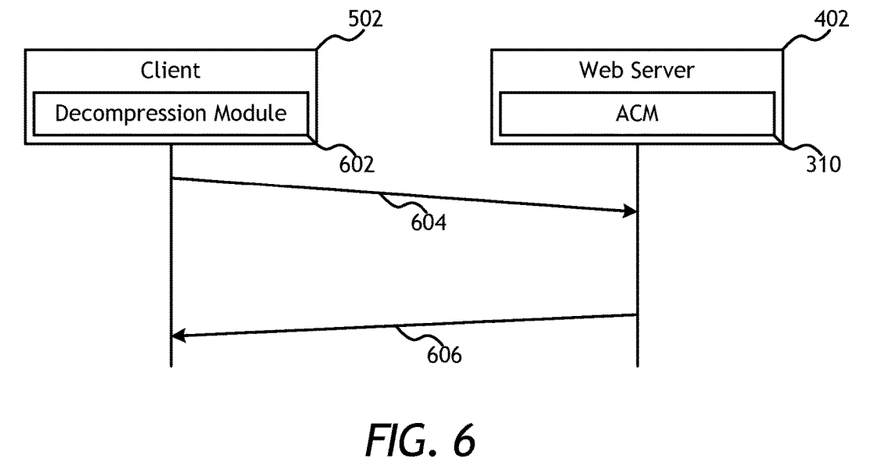
FIG. 6 is a signaling diagram illustrating one embodiment of a communication process for adaptive compression management for web services in a forced compression mode.

FIG. 6 is a signaling diagram illustrating one embodiment of a communication process for adaptive compression management for web services in forced compression mode. In an embodiment, the process is carried out by a web server 402 and a web client 502 over a network 104. In an embodiment, the client may send a request 604 for compressed data to the web server 402. The ACM 310 may determine that compressed data should be returned, and the web server 402 may return 606 compressed data to the web client 502. The decompression module 602 on the client 502 may then decompress the received data. In certain embodiments, communication of compressed data may be a default setting. In other embodiments, the web server 402 may communicate compressed data by default in response to certain commands, or in response to certain network conditions.

Figure 7:
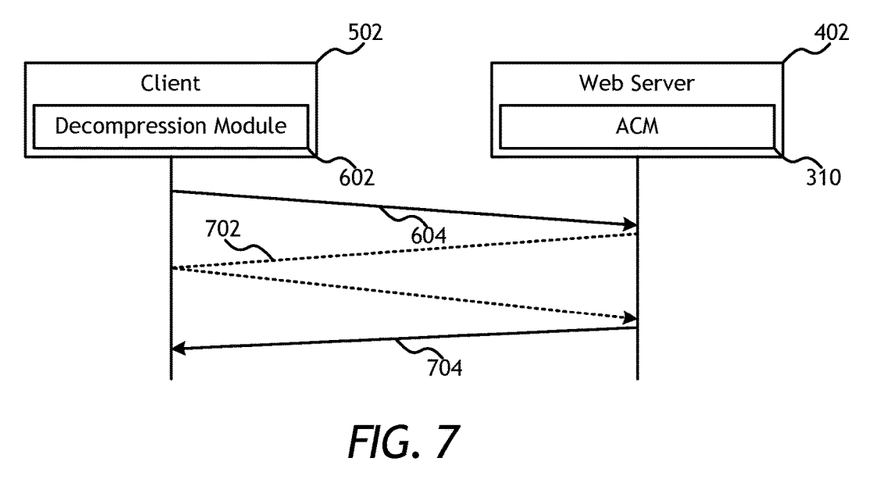
FIG. 7 is a signaling diagram illustrating another embodiment of a communication process for adaptive compression management for web services.

FIG. 7 is a signaling diagram illustrating another embodiment of a communication process for adaptive compression management for web services. In the embodiment of FIG. 7, the web client 402 may send the request 604 for compressed data. In response, the ACM 310 may determine 702 a network statistic, such as round trip time (RTT). If the data is sized beyond a range determined in response to the network statistic, then the web server 502 may return 704 compressed data. If not, the web server 502 may return 704 uncompressed data, thereby saving the overhead of data compression. If the uncompressed data is returned 704, then the decompression module 602 may not need to decompress the received data, thereby saving system resources and improving system performance.

Figure 8:
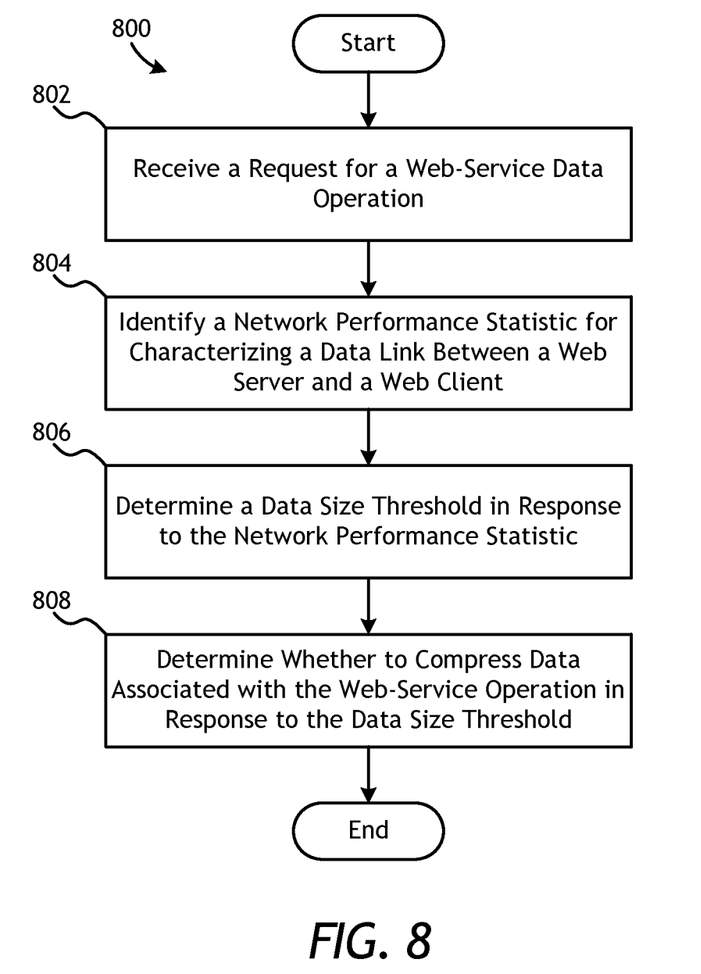
FIG. 8 is a schematic flowchart diagram illustrating one embodiment of a method for adaptive compression management for web services.

FIG. 8 is a schematic flowchart diagram illustrating one embodiment of a method 800 for adaptive compression management for web services. In an embodiment, the method 800 starts at block 802 with receiving a request for a web-service data operation. At block 804, the method 800 may include identifying a network performance statistic for characterizing a data link between a web server 402 and a web client 502. At block 806, the method 800 may include determining a data size threshold in response to the network performance statistic. At block 808, the method 800 may include determining whether to compress data associated with the web-service operation in response to the data size threshold.

Figure 9A:
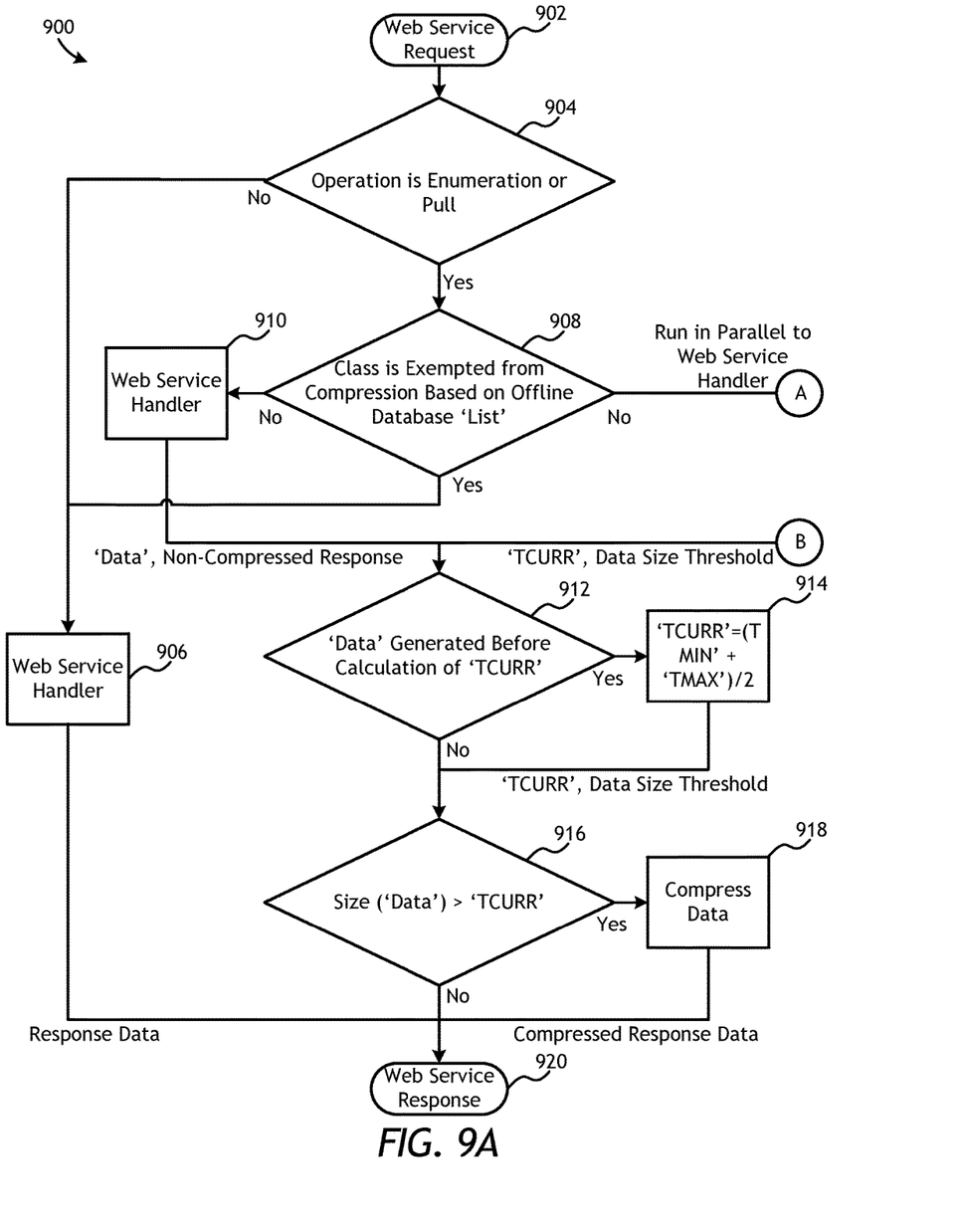
FIG. 9A is a schematic flowchart diagram illustrating another embodiment of a method for adaptive compression management for web services.
Figure 9B:
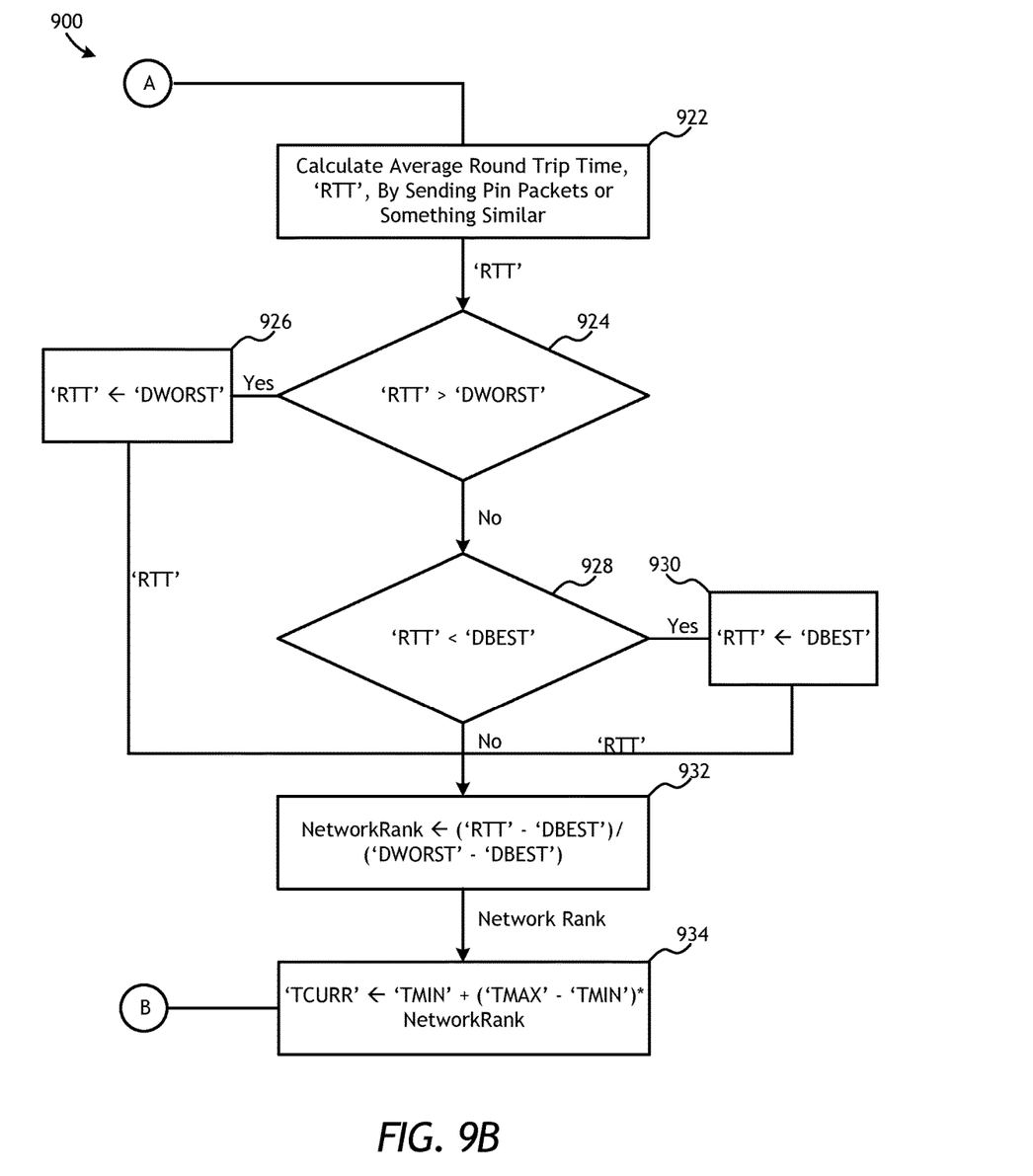
FIG. 9B is a schematic flowchart diagram illustrating further aspects of the method of FIG. 9A.

FIGS. 9A-B is a schematic flowchart diagram illustrating another embodiment of a method 900 for adaptive compression management for web services. Table 1 below lists definitions for acronyms used in FIGS. 9A-B.

TABLE 1

Definition of acronyms in FIG. 9.

| Term | Meaning |
| --- | --- |
| IP | IP Address of the requestor |
| RTT | The calculated Average Round Trip Time |

TABLE 1-continued

Definition of acronyms in FIG. 9.

| Term | Meaning |
|---|---|
| Dbest | A constant representing Best Case N/W Delay |
| Dworst | A constant representing Worst Case N/W Delay |
| Tmin | A constant representing lower Data Threshold |
| Tmax | A constant representing higher Data Threshold |
| Tcurr | Adaptive Threshold Generated |
| Data | Data that has to be sent back to the requestor, the SOAP Response |
| List | Offline Database of classes which are known to return very less data on enumeration |

In an embodiment, the method 900 starts with receiving a web service request as shown at block 902. At block 904, it is determined whether the request is either an "enumeration" request, a "pull" request, or an equivalent. If not, then the web service handler provides the responsive data in the default compressed format as shown at block 906. If the request is enumeration or pull, then at block 908 it is further determined whether the request belongs to a class of requests that is exempted from compression based on an offline database list. If not, the data is passed to a web service handler and the uncompressed data is returned as shown at block 910. If so, then the round trip time of the connection between the web server 402 and the web client 502 is determined as shown at blocks 922-934. At block 922, the ACM may send a ping to the web client 502 to determine the RTT. The RTT is then compared to worst and best historical records as shown at blocks 924 and 928. A network rank (Tcurr) is then determined at blocks 932-934. In an embodiment, Tcurr may be a value between 0 and 1, 0 corresponding to the worst historical network condition and 1 corresponding to the best historical network condition. At blocks 912-918, Tcurr may be used to calculate the data size threshold. In an embodiment, an average of Tmin and Tmax may be used to generate Tcurr as shown at block 914 in the event that the threshold cannot be calculated before the data is retrieved. If the size of the returned data is larger than the threshold, as shown at block 916, then the data may be compressed as shown at block 918. Otherwise the data is uncompressed. The web service then generates the compressed or uncompressed response as shown at block 920 and communicates it to the web client 502.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method, comprising: receiving a request for a web-service data operation, the request for the web-service data operation comprising a request for requested data; identifying, using a data processing device, a network performance statistic for characterizing a data link between a web server and a web client; determining, using the data processing device, a data size threshold in response to the network performance statistic; determining, using the data processing device, whether to compress the requested data in response to the data size threshold; and compressing the requested data in response to a determination that a size of the requested is within a range of data sizes defined by the data size threshold, wherein identifying the network performance statistic comprises determining round-trip time for communications between the web server and the web client.

2. The method of claim 1, further comprising retrieving the requested data in response to the request for a web-service operation.

3. The method of claim 2, wherein the data size threshold is determined in parallel with retrieving the data in response to the request for a web-service data operation.

4. The method of claim 1, wherein determining the data size threshold further comprises comparing a current network performance statistic to a historical maximum and a historical minimum of the network performance statistic.

5. The method of claim 1, wherein determining the data size threshold further comprises comparing a result of the round-trip time measurement, made in response to receiving the request, with the historical maximum and the historical minimum of the round-trip time.

6. The method of claim 1, wherein an average of a historical minimum and a historical maximum of the round-trip time is used to determine the data size threshold if the requested data is retrieved from a storage prior to identifying the network performance statistic.

7. An apparatus comprising: an input interface configured to receive a request for a web-service data operation, the request for the web-service data operating comprising a request for requested data; and a data processing device coupled to the input interface, the data processing device configured to: identify a network performance statistic for characterizing a data link between a web server and a web client; determine a data size threshold in response to the network performance statistic; determine whether to compress the requested data in response to the data size threshold; and compress the requested data in response to a determination that a size of the requested data is within a range of data sizes defined by the data size threshold, wherein identifying the network performance statistic comprises determining, by the data processing device, a round-trip time for communications between the web server and the web client.

8. The apparatus of claim 7, further comprising the requested data storage interface configured to retrieve data in response to the request for a web-service data operation.

9. The apparatus of claim 8, wherein the data size threshold is determined in parallel with retrieving the data in response to the request for a web-service data operation.

10. The apparatus of claim 7, wherein the data processing device is further configured to compare a current network performance statistic to a historical maximum and a historical minimum of the network performance statistic.

11. The apparatus of claim 7, wherein the data processing device is further configured to compare a result of the round-trip time measurement, made in response to receiving the request, with the historical maximum and the historical minimum of the round-trip time.

12. The apparatus of claim 7, wherein an average of a historical minimum and a historical maximum of the round-trip time is used, by the data processing device, to determine the data size threshold if the requested data is retrieved from a storage prior to identifying the network performance statistic.

13. A system comprising: a web client device configured to send a request for a web-service data operation over a network, the web-service data operation comprising a request for requested data; a web server coupled to the network, the web server configured to: receive the request for the web-service data operation; and identify a network performance statistic for characterizing a data link between a web server and a web client; determine a data size threshold in response to the network performance statistic; determine whether to compress the requested data in response to the data size threshold; and compress the requested data in response to a determination that a size of the requested data is within a range of data sizes defined by the data size threshold, wherein identifying the network performance statistic comprises determining, by the web server, a round-trip time for communications between the web server and the web client device.

14. The system of claim 13, further comprising a data storage configured to store the requested data.

15. The system of claim 14, wherein the web server is configured to perform the operations of determining the data size threshold and retrieving the data in response to the request for a web-service data operation in parallel.

16. The system of claim 13, wherein the web server is further configured to compare a current network performance statistic to a historical maximum and a historical minimum of the network performance statistic.

17. The system of claim 13, wherein the web server is further configured to compare a result of the round-trip time measurement, made in response to receiving the request, with the historical maximum and the historical minimum of the round-trip time.

18. The system of claim 13, wherein an average of a historical minimum and a historical maximum of the round-trip time is used, by the web server to determine the data size threshold if the requested data is retrieved from a storage prior to identifying the network performance statistic.

* * * * *